United States Patent [19]
Häuslein

[11] Patent Number: 4,784,051
[45] Date of Patent: Nov. 15, 1988

[54] COFFEE OR TEA MAKER

[75] Inventor: Reinhard Häuslein, Minden, Fed. Rep. of Germany

[73] Assignee: Melitta-Werke Bentz & Sohn, Minden, Fed. Rep. of Germany

[21] Appl. No.: 135,373

[22] Filed: Dec. 21, 1987

[30] Foreign Application Priority Data

Dec. 22, 1986 [DE] Fed. Rep. of Germany ....... 3643878

[51] Int. Cl.⁴ ............................................. A47J 31/00
[52] U.S. Cl. ........................................ 99/307; 99/299
[58] Field of Search ................. 99/279, 280, 281, 282, 99/283, 295, 300, 304, 306, 307, 299; 426/433

[56] References Cited

U.S. PATENT DOCUMENTS

| | | | |
|---|---|---|---|
| 3,220,334 | 11/1965 | Martin | 99/304 |
| 3,589,273 | 6/1971 | Karlen | 99/307 |
| 3,771,432 | 11/1973 | Karlen | 99/307 |
| 4,667,587 | 5/1987 | Wunder | 99/295 |

FOREIGN PATENT DOCUMENTS

1294608 5/1969 Fed. Rep. of Germany .
3406291 9/1985 Fed. Rep. of Germany .
3539007 5/1987 Fed. Rep. of Germany .

*Primary Examiner*—Robert W. Jenkins
*Attorney, Agent, or Firm*—Spencer & Frank

[57] ABSTRACT

A coffee or tea maker for delivering hot water to a pot via a filter vessel comprising a fresh water container; an overflow device disposed for introducing the hot water into the filter vessel when the filter vessel is disposed below a portion of the overflow device, the overflow device including an intermediate vessel having first, second and third passages; a riser pipe disposed between the fresh water container and the intermediate vessel and extending through the first passage; a flow heater for heating the water in the riser pipe; a support location for the pot; a siphon extending through the second passage and disposed for periodically emptying the intermediate vessel; and a ventilation pipe extending through the third passage and having first and second ends, wherein the first end of the ventilation pipe is disposed in the intermediate vessel and the second end of the ventilation pipe is disposed outside of the intermediate vessel; and wherein the intermediate vessel is closed on all sides except for the passages.

6 Claims, 2 Drawing Sheets

COFFEE OR TEA MAKER

BACKGROUND OF THE INVENTION

1. Field of the Invention

The present invention relates to a coffee or tea maker which includes: a fresh water container, a filter vessel, a pot, a flow heater, a riser pipe and an overflow device for introducing the heated water into the filter vessel disposed above the pot.

2. Discussion of the Prior Art

Coffee or tea makers of the above-mentioned type are known per se and are used primarily in homes or offices.

In the prior art coffee or tea makers of this type, the cold water present in the fresh water container is heated by the flow heater and is passed through a riser pipe to the overflow device which then empties into the filter vessel.

On the basis of the heating power of the customarily employed flow heaters, the speed with which the heated water flows into the filter vessel is relatively slow. Further experience has shown that a comparatively thin stream of water develops. These two facts are the reason that at the beginning of the filtering process, the aromatic substance disposed in the filter vessel is not optimally moistened.

Coffee or tea makers are known in which hot water can be introduced into a filter vessel at relatively high flow rates and in comparatively large quantities. Such coffee or tea makers are used in the restaurant business and are equipped either with steam pressure systems or other containers which are connected to the water mains.

Aside from the fact that such coffee or tea makers have a rather large volume, transferring these construction principles to household coffee or tea makers would be neither advisable nor economically justifiable.

SUMMARY OF THE INVENTION

It is an object of the present invention to provide a coffee or tea maker of a type where it is possible, to convey the heated water into the filter vessel in increments and thus in larger quantities per unit time than was possible in the past.

It is a further object of the invention to provide a coffee or tea maker which is particularly user friendly and has a structure that requires low-maintenance.

It is a further object of the invention to provide a coffee or tea maker which requires low structural and manufacturing expenditures.

The above and other objects are accomplished by the invention in which a coffee or tea maker for delivering hot water to a pot via a filter vessel comprises a fresh water container; an overflow means disposed for introducing the hot water into the filter vessel when the filter vessel is disposed below a portion of said overflow means, said overflow means including an intermediate vessel having first, second and third passages; a riser pipe disposed between said fresh water container and said intermediate vessel and extending through said first passage; a flow heater for heating the water in said riser pipe; means defining a support location for the pot; a siphon extending through said second passage and disposed for periodically emptying said intermediate vessel; and a ventilation pipe extending through said third passage and having first and second ends, wherein said first end of said ventilation pipe is disposed in said intermediate vessel and said second end of said ventilation pipe is disposed outside of said intermediate vessel; and wherein said intermediate vessel is closed on all sides except for said passages.

Such a configuration is easily realized from a manufacturing and a low-cost point of view. The invention offers the functional advantage that initially partial quantities of the brewing water are collected in the intermediate vessel and are then transferred into the filter vessel in the shortest possible time. The coffee and tea maker according to the present invention is particularly distinguished by the fact that it is not necessary to operate this appropriately equipped coffee or tea maker in a special manner since the siphon empties the intermediate vessel automatically when the brewed water reaches a predetermined level in the intermediate vessel.

It is particularly desirable for the intermediate vessel to be completely emptied at the end of the entire brewing process even if there are only small quantities of water flow in the intermediate vessel. In this case, an excess pressure develops in the intermediate vessel which is generated by the evaporation of the remaining quantity of water in the flow heater. This excess pressure ensures that the residual quantities of water reaching the intermediate vessel are pressed out of the siphon and fed to the filter vessel. The system is designed so the ventilation pipe has an appropriately small cross section to prevent reduction of this excess pressure by the ventilating pipe.

BRIEF DESCRIPTION OF THE DRAWINGS

The invention may be better understood by referring to the detailed description of the invention when taken in conjunction with the accompanying drawings in which.

DESCRIPTION OF THE PREFERRED EMBODIMENTS

Figure 1:
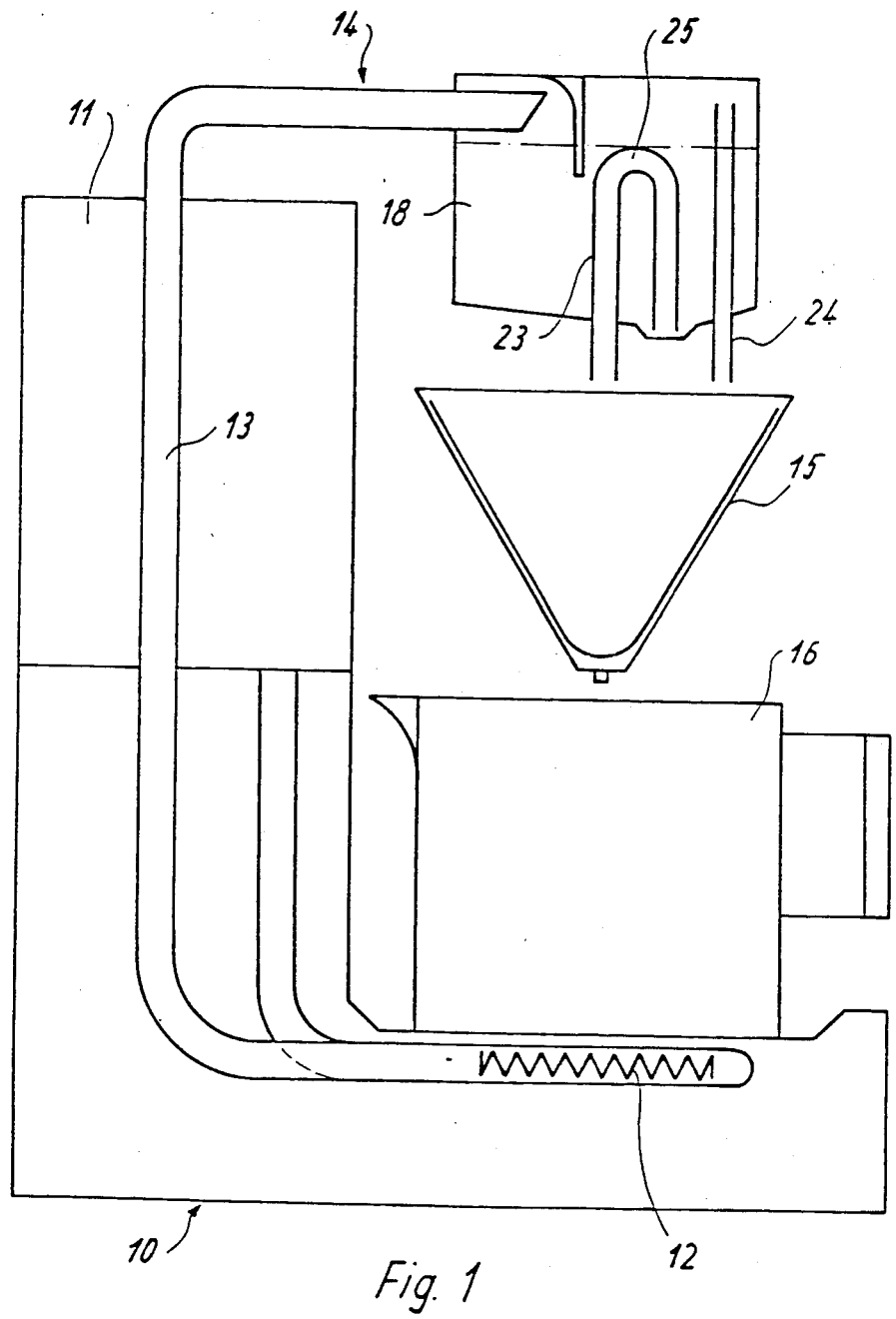
FIG. 1 is a schematic representation of a coffee or tea maker according to the present invention.

FIG. 1 shows a coffee or tea maker 10 having the basic structure of so-called household coffee or tea makers. A predetermined quantity of cold water is filled into a fresh water container 11. This cold water is heated by a flow heater 12 and is transferred through a riser pipe 13 and an overflow device, identified as a whole by the reference numeral 14, into a filter vessel 15 which is disposed above a pot 16 receiving the filtrate.

Pot 16 customarily stands on a heating plate 17.

Overflow device 14 is equipped with an intermediate vessel 18 whose particularities will be described in greater detail below.

Intermediate vessel 18 is equipped with a siphon 23 whose outlet opens into filter vessel 15.

Additionally, intermediate vessel 18 is provided with a ventilation pipe 24. This ventilation pipe 24 extends vertically above the region of the elbow 25 of siphon 23. Otherwise, intermediate vessel 18 is closed on all sides.

This structure operates as follows:

Initially, heated water is transported into intermediate vessel 18. Once the fill level in intermediate vessel 18 is high enough to fill the elbow 25 of siphon 23, siphon 23 comes into action and empties intermediate vessel 18 automatically into filter vessel 15.

If during the last conveying cycle, intermediate vessel 18 can no longer be filled completely, steam pressure presses the remaining quantity of water in intermediate vessel 18 through siphon 23 into filter vessel 15. The cross section of ventilation pipe 24 is advisably selected to be such that the ventilation pipe 24 is unable to discharge the quantity of steam developed by the evaporation of residual quantities of water in flow heater 12. This allows a conveying pressure to be generated for the residual quantities of water in intermediate vessel 18 whereby the water is forced out of siphon 23 into filter vessel 15.

Figure 2:
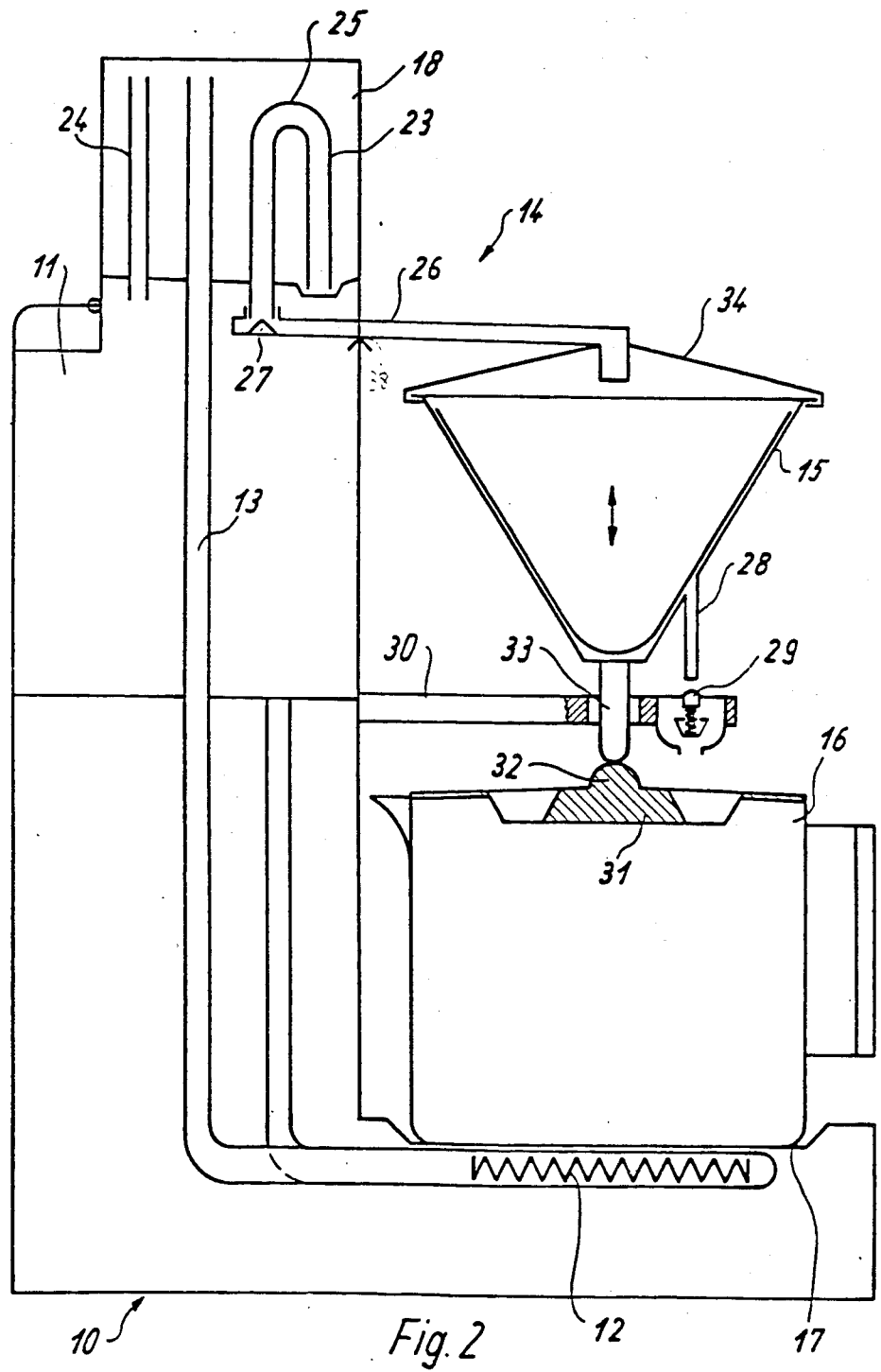
FIG. 2 shows a schematic representation of a further embodiment of the coffee or tea maker according to the invention.

FIG. 2 shows a further embodiment of the present invention including a siphon 23 for emptying intermediate vessel 18. In this embodiment, intermediate vessel 18 is disposed above fresh water container 11. Riser pipe 13 again opens into this intermediate vessel 18. Intermediate vessel 18 is provided with a ventilation pipe 24 which has one end which leads back to fresh water container 11 and another end which opens at a level above elbow 25.

The outlet end of siphon 23 opens into an overflow pipe 26 which leads to filter vessel 15.

This overflow pipe 26 is mounted so that it is able to swing back and forth and is equipped with a sealing cone 27 in the region where siphon 23 opens into it. Overflow pipe 26 pivots on point 38 which is on the wall of the fresh water container.

Filter vessel 15 is provided in a known manner with a siphon outlet 28 which is disposed in axial alignment with a spring charged closing valve 29. This closing valve 29 is disposed at an arm 30 of the housing of coffee or tea maker 10.

Filter vessel 15 is vertically movable in the sense of the double arrow of FIG. 2 and also contains a lid 34.

The pot 16 receiving the filtrate is provided with a lid 31 that has a switching cam 32 in its center. This switching cam 32 cooperates with a plunger 33 of filter vessel 15.

The coffee or tea maker shown in FIG. 2 operates as follows:

If pot 16 and its lid 31 are at its intended location on heating plate 17, switching cam 32 causes plunger 33 to lift filter vessel 15 vertically into its position shown in FIG. 2. In this position, siphon outlet 28 of filter vessel 15 is raised away from closing valve 29, i.e. siphon outlet 28 is open. Additionally, the pivotally mounted overflow pipe 26 is pivoted above filter vessel 15 so that sealing cone 27 is lifted away from the outlet opening of siphon 23 thereby opening the outlet opening of siphon 23. In this position, shown in FIG. 2, heated brewing water is able to flow from intermediate vessel 18 into filter vessel 15 through siphon 23 and overflow pipe 26.

If now pot 16 is removed, either intentionally or erroneously, filter vessel 15 moves downwardly. This movement causes siphon outlet 28 to become closed by closing valve 29 and sealing cone 27 to seal the outlet opening of siphon 23. By closing sealing cone 27 no further hot water can reach filter vessel 15 and by closing the closing valve 29 no filtrate can flow out of filter vessel 15.

As the remaining brewing water is continuously conveyed into intermediate vessel 18 with sealing cone 27 closed, the ventilation bore 24 allows the excess hot water to return to fresh water container 11.

The present disclose relates to the subject matter disclosed in German P No. 36 43 878.2 of Dec. 22nd, 1986, the entire specification of which is incorporated herein by reference.

It will be understood that the above description of the present invention is susceptible to various modifications, changes and adaptations, and the same are intended to be comprehended within the meaning and range of equivalents of the appended claims.

What is claimed is:

1. A coffee or tea maker for delivering hot water to a pot via a filter vessel comprising:
   a fresh water container;
   an overflow means disposed for introducing the hot water into the filter vessel when the filter vessel is disposed below a portion of said overflow means, said overflow means including an intermediate vessel having first, second and third passages;
   a riser pipe disposed between said fresh water container and said intermediate vessel and extending through said first passage;
   a flow heater for heating the water in said riser pipe;
   means defining a support location for the pot;
   a siphon extending through said second passage and disposed for periodically emptying said intermediate vessel; and
   a ventilation pipe extending through said third passage and having first and second ends, wherein said first end of said ventilation pipe is disposed in said intermediate vessel and said second end of said ventilation pipe is disposed outside of said intermediate vessel; and
   wherein said intermediate vessel is closed on all sides except for said passages.

2. A coffee or tea maker according to claim 1, wherein said siphon includes an elbow and said first end of said ventilation pipe extends above said elbow of said siphon.

3. A coffee or tea maker according to claim 1, said overflow means further comprising a pivotally mounted overflow pipe including a sealing cone disposed therein, said overflow pipe being movable between first and second pivoted end positions and said siphon has an outlet region disposed to empty into said overflow pipe and being closed by said sealing cone when said overflow pipe is in said first pivoted end position.

4. A coffee or tea maker according to claim 1, wherein said second end of said ventilation pipe is disposed in said fresh water container.

5. A coffee or tea maker according to claim 1, further including means for removing residual quantities of water from said intermediate vessel.

6. A coffee or tea maker according to claim 1, wherein said second end of said ventilation pipe is disposed above the location of the filter vessel.

* * * * *